(12) United States Patent
Ratte

(10) Patent No.: US 7,163,764 B2
(45) Date of Patent: Jan. 16, 2007

(54) ENHANCED TORQUE RESISTANT BATTERY PART

(75) Inventor: Robert W. Ratte, North Oaks, MN (US)

(73) Assignee: Water Gremlin Company

( * ) Notice: Subject to any disclaimer, the term of this patent is extended or adjusted under 35 U.S.C. 154(b) by 530 days.

(21) Appl. No.: 10/687,485

(22) Filed: Oct. 16, 2003

(65) Prior Publication Data
US 2005/0084751 A1   Apr. 21, 2005

(51) Int. Cl.
*H01M 2/30* (2006.01)
*H01M 2/26* (2006.01)
*B22D 19/00* (2006.01)

(52) U.S. Cl. .................. 429/182; 429/161; 439/766

(58) Field of Classification Search .................. 429/98, 429/161, 182; 439/766
See application file for complete search history.

(56) References Cited

FOREIGN PATENT DOCUMENTS

| JP | 07211309 A | * | 8/1995 |
| JP | 09167610 A | * | 6/1997 |
| JP | 2000164199 A | * | 6/2000 |

* cited by examiner

*Primary Examiner*—Gregg Cantelmo
(74) *Attorney, Agent, or Firm*—Jacobson & Johnson

(57) ABSTRACT

An embedded fastener having enhanced torque resistance and a method of making an embedded fastener with enhanced torque resistance comprising interposing a layer between the lead battery part and the fastener. In one embodiment an electrically conducting layer of a lead adhereable layer is applied to the exterior surface of a fastener. Next, one places the fastener with the layer of lead adhereable material in a mold and injects molten lead into mold and allows the molten lead to solidify around the layer of lead adhereable material on the fastener to thereby secure the solidified lead to the layer of lead adhereable material on the fastener to provide a battery part having a fastener therein with enhanced torque resistance.

17 Claims, 1 Drawing Sheet

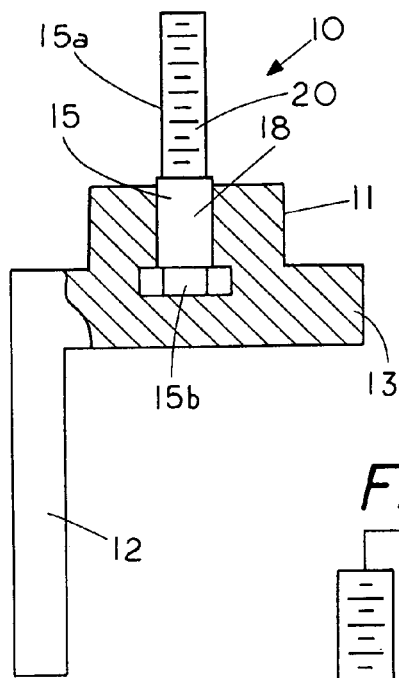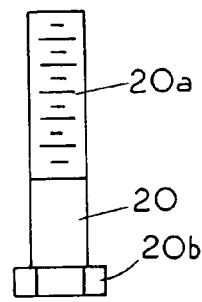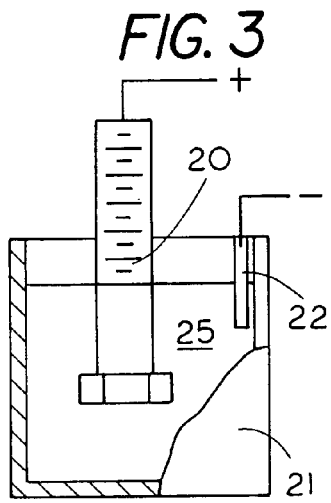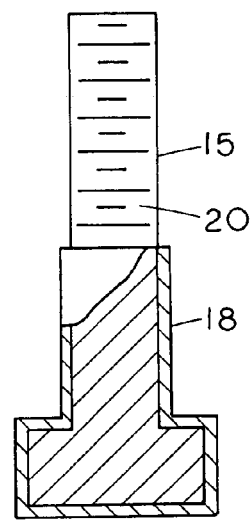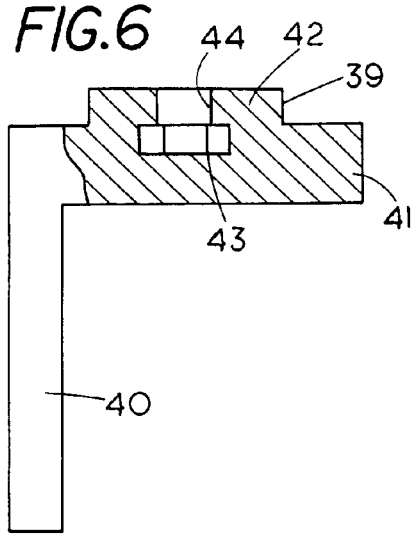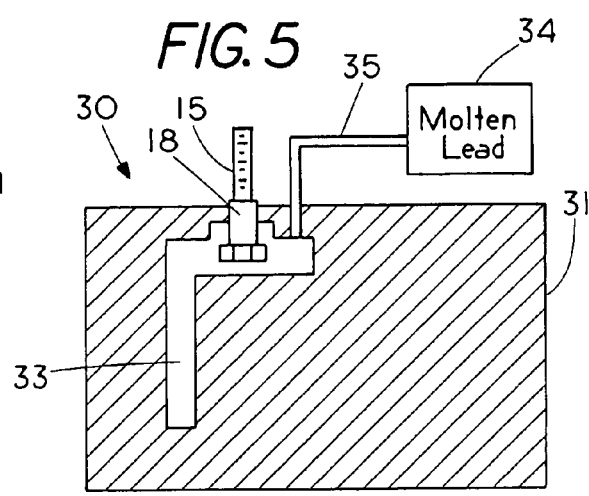

ENHANCED TORQUE RESISTANT BATTERY PART

FIELD OF THE INVENTION

This invention relates to battery parts and, more specifically, to a battery part having a fastener such as a bolt or nut at least partially embedded therein with a layer of material interposed between the battery part and the fastener to provide enhanced torque resistance.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of battery parts made of lead that have a threaded fastener such as a bolt or a nut embedded in the battery part are known in the art. Typically, the battery terminals are made from lead, which is a good electrical conductor but relatively soft. In order to support a threaded connection to the lead battery terminal a fastener made of a harder material is embedded within the battery terminal. In one embodiment a nut having an internal thread is embedded within the terminal so that a male fastener can threadingly engage the threads on the nut to form a good electrical connection therebetween. In another embodiment a stud bolt having a head on one end and a male thread on the other end is partially embedded in the battery terminal with the male threads in a condition to receive a female fastener. In both cases battery cables or the like can be firmly secured to the battery terminal using the threads on the embedded fastener.

One of the difficulties with the use of fasteners made of harder material such as steel is that while the harder fasteners provide threads that retain their integrity and thus can be used to tightly secure a battery cable thereto, the fasteners can be accidentally twisted free of the supporting lead battery terminal. Typically, a fasteners such as a bolt or nut is made from a non-lead material such as stainless steel and includes a hexagonal shaped head or the like that mechanically engages the lead in the battery terminal similar to a wrench engaging the flats on the sides of a fastener. The fastener, which is formed separate from the battery terminal is mechanically secured in the terminal by either cold forming the lead around the fastener or pouring molten lead into a mold surrounding the fastener. The lead is allowed to cool and solidity around the fastener exterior sides to mechanically lock the fastener to the battery terminal.

By mechanically locking the embedded fasteners to the battery terminal one inhibits the fastener from rotating when an external member is secured to the fastener similar to the manner a wrench engages the flats on a fastener to prevent rotation thereof. Thus the mechanical locking provides a torque resistance that maintains the fastener in a non-rotatable condition in the battery terminal. Although mechanical engagement between the embedded fastener prevents the fastener from rotating in the battery terminal, if the external fastener is accidentally over torqued the excess torque on the embedded fastener can deform the soft lead in the battery terminal, which allows the embedded fastener to rotate within the terminal. If the fastener is free to rotate within the terminal it can result in a person having to replace the entire battery.

The present invention provides a method of enhancing the torque resistance of an embedding fastener, which is normally retained solely by mechanical engagement in a battery terminal, by the discovery that interposing a layer of an adhereable material between the fastener and the battery part provides an embedded fastener with enhanced torque resistance.

SUMMARY OF THE INVENTION

An embedded fastener having enhanced torque resistance and a method of making an embedded fastener with enhanced torque resistance comprising interposing a layer between the lead battery part and the fastener. In one embodiment an electrically conducting layer of a lead adhereable layer is applied to the exterior surface of the fastener. Next one places the fastener with the layer of lead adhereable material in a mold and injects molten lead into mold and allows the molten lead to solidify around the layer of lead adhereable material on the fastener to thereby secure the solidified lead to the layer of lead adhereable material on the fastener to provide a battery part having a fastener therein with enhanced torque resistance.

BRIEF DESCRIPTION OF THE DRAWINGS

FIG. 1 is a partial sectional view of a fastener partially embedded in a battery terminal;

FIG. 2 is an elevation view of a stud bolt fastener for embedding in a battery terminal;

FIG. 3 is a partial section view of a plating bath showing a stud bolt fastener being plated with a layer of a lead adhereable material;

FIG. 4 is a partial sectional view showing the layer of lead adhereable material on the fastener that is to be embedded in a battery terminal;

FIG. 5 is a partial cross sectional view showing a fastener in a mold where molten lead is injected; and FIG. 6 is a partial cross sectional view showing a nut embedded and bonded in the battery terminal.

DESCRIPTION OF THE PREFERRED EMBODIMENT

FIG. 1 shows a partial cross sectional view of a battery terminal 10 having a strap 12 for securement to a battery plate and a flange or lead member 13 containing a boss 11 with a bolt fastener 20 partly embedded therein. Bolt fastener 20 includes a shank 15 with a threaded end 15a and a hexagonal shaped head 15b having flats thereon for mechanically engaging with the lead terminal. Encapsulating a portion of the bolt 20, which is embedded in the lead terminal, is a layer or coating of an electrically conductive material 18 that adheres to the exterior surface of bolt 20. In the present invention the electrically conductive layer comprises a metal or metal alloy that is bonded to the fastener 20 with the layer of metal either directly or indirectly securable to a lead terminal.

FIG. 2 shows a fastener comprising an uncoated stainless steel bolt 20 having a cylindrical shank with a male thread 20a on one end and a hex head with flats 20b on the opposite end. Typically, stainless steel bolts are embedded in a lead terminal to provide a connection region for an external fastener. While fasteners, such as stainless steel, have good characteristics for use in a battery environment the lead contacting the fastener generally does not adhere to or bond well with a stainless steel fastener. The reference to lead as contained hereunto refers not only to lead but lead that is alloyed with or that contains other metals.

Since a metal such as stainless steel or the like does not adhere or bond to lead substantially all the torque resistance of an embedded fastener made of stainless steel or the like is due to the mechanical engagement between the fastener and the surrounding lead. In the present invention the torque resistance provided for by the mechanical engagement is enhanced by interposing a thin layer of a lead adherable material between the lead in the battery terminal and the fastener.

FIG. 4 shows a fastener comprising a stainless steel bolt 20 that is coated with a layer of material 18 that can either be directly or indirectly adhered to a lead battery terminal. One method of adhering the layer of lead adhereable material 18 to the fastener is to bond a layer of electrically conducting material to the bolt 20 through an electroplating process. In this process the bolt 20 is placed in an electrolyte bath 25 (FIG. 3) with the bolt 20 forming a cathode. An anode 22, also located in the electrolyte bath forms a source 22 of metal ions in the bath which are attracted to and bonded to the cathode 20. Applying an electrical current across the anode and cathode causes the ions to bond to the exterior surface of bolt 25. While electroplating has been described as a method of adhering a layer of lead adhereable material to the fastener other methods of securing a layer of a lead adhereable material to the fastener can be used including chemical, mechanical or electromagnetic methods. Also, while metalization process is preferred other non-metalization process can be used.

In certain cases one may bond a first metal to the fastener that may or may not bond to the lead and then bond a second metal to the first metal which does bond to the lead. An example of such a procedure involves placing a sublayer of nickel onto the fastener and then placing a sub layer of tin over the nickel. When a molten lead alloy is allowed to solidify around the tin the lead bonds to the tin to improve the torque resistance of the fasteners. Although the type and shape of the fasteners can vary it has been found that by applying a nickel coating of 0.0002 inches to a stainless steel bolt and then applying a tin coating of 0.00005 inches to the nickel coating followed by allowing molten lead to solidify and mechanically engage the fastener causes the torque resistance to increase approximately a 100% over a fastener that is only mechanically secured in the battery terminal. Thus a coating of a lead adhereable material having a thickness of less than 0.0003 inches can substantially enhance the torque resistance of a fastener.

FIG. 4 shows bolt fastener 20 partly in cross section to reveal the layer 18 encapsulating the lower portion the bolt fastener that is embedded in the lead terminal. While only one layer can be used the layer 18 can be formed of sublayers of different materials. In addition although the entire portion of the embedded fastener is coated with a layer of electrically conducting lead adhereable material in some cases only a portion of the embedded fastener need be coated with a layer of lead adhereable material to enhance the torque resistance between the fastener and the lead battery part.

FIG. 5 shows the formation of the improved torque resistant battery terminal with a system 30 that includes a battery part mold 31 with a bolt fastener suspended in a battery part cavity 33. A source of molten lead 34 supplies molten lead to battery part cavity 33 through conduit 35.

FIG. 6 shows an alternate embodiment of the invention wherein a lead terminal 39 having a strap or extension 40, a flange 41 and a boss 42 with a nut fastener 43 having an internal thread (not shown) is embedded in the terminal 39. An opening 44 allows for access to the internal threads of the nut fastener 43 to enable an operator to secure a clamp or battery cable thereto.

In the preferred embodiment a layer or coating of lead adhereable material, which is electrically conductive, is placed over the entire exterior lead contacting surface of the fastener. It is envisioned that in certain instances that a non-electrically conducting layer or insulating layer conducting material could also be used to secure the fastener to the battery part. In those applications the electrical path could be through another portion of the battery terminal then the portion that has the layer of non-electrically material interposed between the fastener and the battery part. Such an arrangement allows one to interpose different types of materials between the fastener and the battery part while still allowing one to maintain an electrical path between the battery part and an external members such as a cable or clamp.

I claim:

1. A torque resistant battery part comprising;
   a lead member;
   a stainless steel bolt having a male thread on one end;
   a layer of a lead adhereable material secured to at least a portion of the bolt with the layer of the lead adhereable material engaging the lead member to thereby provide the torque resistance to the stainless steel bolt with said layer of lead adhearable material comprising a sublayer of nickel placed on the stainless steel bolt and a sublayer of tin placed over the sublayer of nickel.

2. The battery part of claim 1 wherein the thickness of the layer of lead adhereable material is less than 0.0003 inches.

3. The battery part of claim 1 wherein the battery part comprises a battery terminal with the stainless steel bolt in mechanical engagement with the battery terminal.

4. A battery part comprising:
   a lead member;
   a fastener at least partially embedded in the lead member; and
   a layer of an electrical conducting material interposed between the fastener and the lead member with the electrically conducting material bonded to the fastener and to the lead member to provide torque resistance wherein said layer of the electrically conducting material includes at least two sublayers.

5. The battery part of claim 4 wherein the fastener is in mechanical engagement with the lead member.

6. The battery part of claim 4 wherein a one of the at least two sublayers is bonded to the fastener and another of the at least two sublayers is bonded to the lead member with the at least two sublayers bonded to each other to thereby provide torque resistance to the fastener.

7. The battery part of claim 4 wherein one of the sublayers comprises a layer of tin.

8. The battery part of claim 4 wherein one of the sublayers comprises layer of nickel.

9. The battery part of claim 4 wherein the fastener comprises stainless steel.

10. The battery part of claim 9 wherein the sublayer bonded to the stainless steel fastener comprises tin.

11. The battery part of claim 10 wherein the sublayer bonded to the lead member comprises nickel.

12. The battery part of claim 10 wherein the sublayers bonded to the stainless steel faster is an electroplated sublayer.

13. A method of forming a battery terminal comprising:
placing a coating of a lead adhereable electrically conducting material on an exterior surface of at least a portion of a fastener wherein said coating of a lead adhereable electrically conducting material comprises placing a layer of nickel on the fastener and placing a layer of tin over the nickel; and
embedding the fastener in a lead terminal by flowing molten lead around the fastener with the lead adhereable conducting material to secure the fastener to the lead and thereby enhance a torque resistance of the fastener.

14. The method of claim 13 wherein the step of placing a coating of the lead adhereable electrical conducting material on a fastener comprises placing the lead adhereable electrical conducting material on a stud bolt fastener.

15. The method of claim 13 wherein the step of placing a coating of the lead adhereable electrical conducting material on a fastener comprises placing the lead adhereable electrical conducting material on a nut fastener.

16. The method of claim 13 wherein the lead adhereable coating is placed on a stainless steel fastener.

17. The method of claim 13 wherein the placing of the lead adhereable coating comprises electroplating the lead adhereable coating on the fastener.

* * * * *